United States Patent [19]
Sambamurthy et al.

[11] Patent Number: 5,504,738
[45] Date of Patent: Apr. 2, 1996

[54] APPARATUS AND METHOD FOR FULL-DUPLEX ETHERNET COMMUNICATIONS

[75] Inventors: Namakkal S. Sambamurthy; Woo-Ping Lai, both of San Jose; John P. VanGilder, Sunnyvale, all of Calif.

[73] Assignee: Seeq Technology Inc., Fremont, Calif.

[21] Appl. No.: 227,851

[22] Filed: Apr. 15, 1994

Related U.S. Application Data

[63] Continuation of Ser. No. 966,978, Oct. 27, 1992, Pat. No. 5,311,114.

[51] Int. Cl.⁶ .......................... H04L 29/08; H04L 12/413
[52] U.S. Cl. .............................................. 370/31; 370/85.3
[58] Field of Search .................................. 370/24, 26, 31, 370/85.3; 375/212, 219, 220, 377; 371/32, 57.2; 178/4.1 C, 692, 69 H

[56] References Cited

U.S. PATENT DOCUMENTS

| | | | |
|---|---|---|---|
| 4,701,909 | 10/1987 | Kavehrad | 370/85.3 |
| 4,897,831 | 1/1990 | Negi et al. | 370/31 |
| 5,012,467 | 4/1991 | Crane | 370/85.3 |
| 5,054,019 | 10/1991 | Mathis et al. | 370/31 |
| 5,079,766 | 1/1992 | Richard | 370/85.3 |
| 5,121,382 | 6/1992 | Yang et al. | 370/31 |
| 5,251,203 | 10/1993 | Thompson | 370/85.3 |
| 5,311,114 | 5/1994 | Sambamurthy et al. | 370/31 |

*Primary Examiner*—Benedict V. Safourek
*Attorney, Agent, or Firm*—D'Alessandro & Ritchie

[57] ABSTRACT

A downward compatible full-duplex 10Base-T ethernet transceiver associated with both the hub or the remote node in an ethernet network includes generator circuitry for generating a full-duplex-capability signal indicating its full-duplex capability for transmission over the twisted pair link and detector circuitry for detecting transmission of such a signal from the transceiver with which it is communicating across the twisted pair link. The detector circuitry responds to the full-duplex-capability signal by sending a full-duplex enable signal to an ethernet controller configured according to the present invention. An ethernet controller contains circuitry responsive to the full-duplex-enable signal to disable transmission deferral in response to a carrier-sense signal generated by the transceiver. The full-duplex-capability indicator portion may comprise an extra pulse following an Nth link-integrity pulse after a delay of between about 2–7 μsec.

18 Claims, 11 Drawing Sheets

80C24 LINK ⊓ GENERATION & DETECTION WINDOWS

|  |  | IEEE STD. |  | 80C24 SPEC. |
|---|---|---|---|---|
| 1). LINK_LOSS | 50 | → | 150ms | 105ms |
| 2). LINK_TEST_MAX | 25 | → | 150ms | 105ms |
| 3). LINK_TEST_MIN | 2 | → | 7ms | 4ms |
| 4). LC_MAX | 2 | → | 10 inclusive | 4 counts |

SEEQ ⊓ GENERATION RELATIVE TO REGULAR LINK ⊓

REGULAR LINK - PULSES GENERATION:

$7ms < T < 25ms$

REGULAR LINK - PULSES WITH EMBEDDED SEEQ PULSES GENERATION:

SEEQ FULL DUPLEX CAPABILITY DETECTION (CONTINUED)

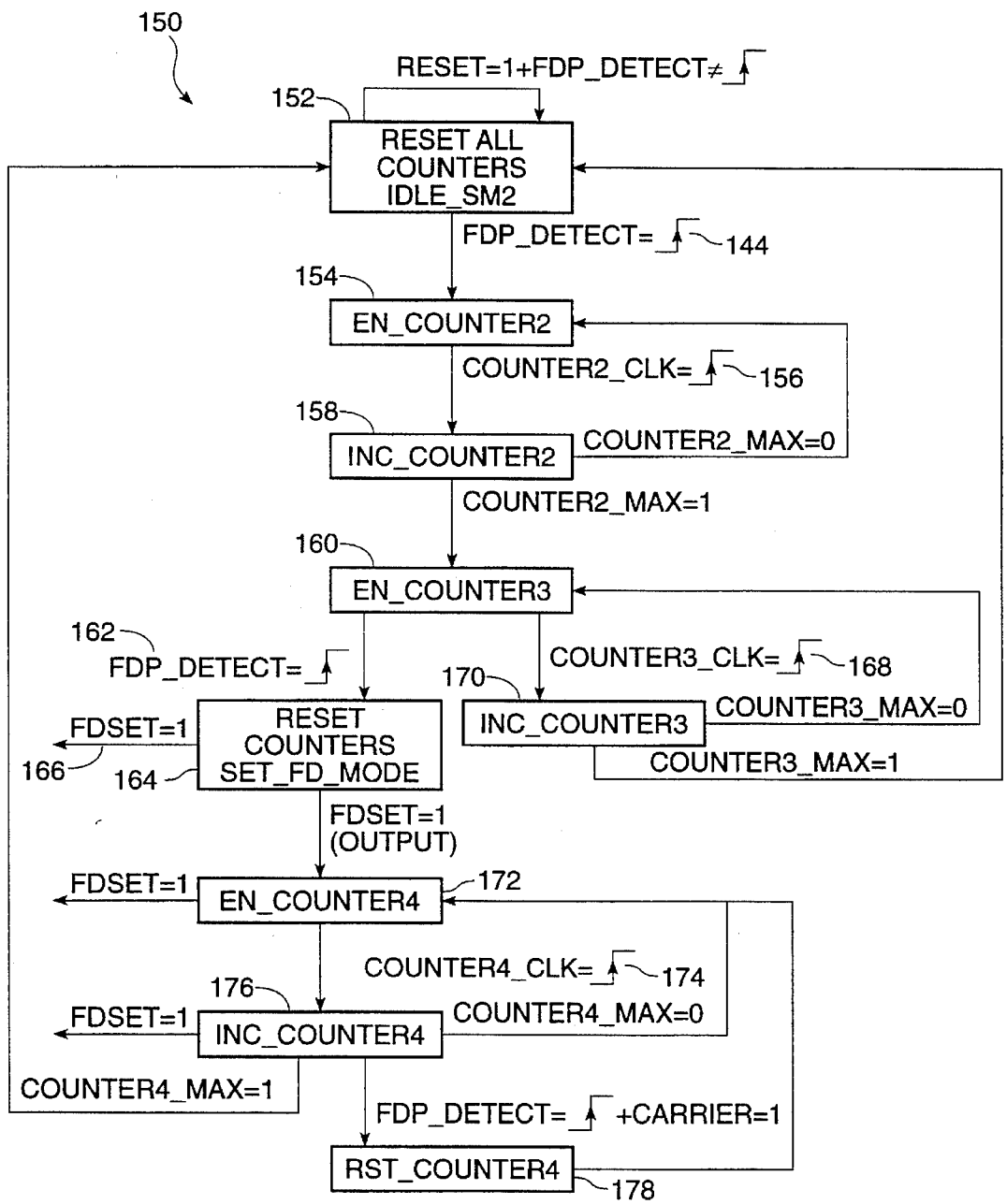

IN THE ABOVE STATE DIAGRAM RESET=1 ALWAYS MOVES BACK TO THE IDLE_SM2 STATE.

THE OUTPUT FDSET IS ONLY ONE IN THE SET_FD_MODE, EN_COUNTER4, AND INC_COUNTER4 STATES, OTHERWISE IT IS ZERO.

IN THE SEEQ REALIZATION OF THIS FUNCTION THE FOLLOWING IS TRUE.

COUNTER1_MAX ≈ 6.4 μsec
COUNTER2_MAX ≈ 197–203 msec
COUNTER3_MAX ≈ 216–223 msec
COUNTER4_MAX ≈ 833–840 msec

NOTE: ALL COUNTERS ARE RESET UPON FDSET=1

*FIG. 9B*

APPARATUS AND METHOD FOR FULL-DUPLEX ETHERNET COMMUNICATIONS

CROSS-REFERENCE TO RELATED APPLICATION

This application is a continuation of application Ser. No. 07/966,978, filed Oct. 27, 1992, now U.S. Pat. No. 5,311,114, issued May 10, 1994.

BACKGROUND OF THE INVENTION

1. Field of the Invention

The present invention relates to integrated circuit technology and to integrated circuits for use in ethernet technology. More particularly, the present invention relates to ethernet transceiver and communications controller integrated circuits and protocols for enabling performance of full duplex ethernet communications in ethernet networks employing separate transmit and receive ports for each node, such as 10Base-T networks. The circuits are downward compatible for use in ethernet networks employing half-duplex ethernet transceivers.

2. The Prior Art

Ethernet CSMA/CD based networks have attained wide spread acceptance and use since their introduction in early 1970's. Currently, ethernet is a half-duplex protocol and most present ethernet implementations use coaxial cable based networks. In the typical coaxial-cable based ethernet configuration, the network is set up in a bus topology, and comprises a plurality of ethernet nodes, each including a transceiver connected to the common bus. Each ethernet transceiver used is a current switch for data transmission on the bus, which is a coaxial cable. Those of ordinary skill in the art will recognize that, due to the existence of only a single communications channel, only one transceiver at a time can transmit data without creating a "collision" on the single bus. All other nodes on the network "listen" to the bus while any one node is transmitting. While transmitting, a node cannot receive data from any other node on the network, although it may receive its own data in a self-receive/loop-back function.

In late 1990, a new ethernet media standard referred to as "10Base-T" was proposed and accepted. Ethernet architectures according to the 10Base-T ethernet standard comprise a star topology, wherein a plurality of remote nodes radiate from a central hub or multiport bridge. Each remote node includes a transceiver which communicates with a corresponding transceiver in the hub. Unlike the single communications channel coaxial-cable based architectures, each remote node in the 10Base-T ethernet architecture employs two pairs of unshielded twisted-pair telephony grade cable as the transmission medium, one pair for transmitting and one pair for receiving. A transceiver is provided in the central hub for each node, as well as circuitry which switches all signals transmitted from one remote node to the other remote node for which it is intended.

Unlike the coaxial cable ethernet configuration scheme wherein collisions which are simultaneous transmission attempts by more than one node are detected by monitoring average DC voltage levels, a collision signal is generated by a transceiver in the 10Base-T configuration if it senses simultaneous data activity on both its transmit and receive pairs. In addition, the loop-back function is implemented in a pseudo fashion in 10Base-T. The result in both coaxial and twisted pair media based ethernet networks is that any node effectively has only a half-duplex media communication channel.

As a part of the ethernet standard ANSI/IEEE Std. 802.3i-1990, and ANSI/IEEE 802.3 CSMA/CD (1990), both expressly incorporated herein by reference, all 10Base-T ethernet networks use Link Integrity Test pulses to protect the network from link segment, failures. According to the current protocol, each ethernet transceiver sends a series of link pulses over its transmit twisted pair to the receive twisted pair of the transceiver to which it is connected. The central hub/concentrator typically provides the cross-wiring function needed to implement this architecture. After each pulse is sent, the receiver expects to receive another pulse within a time window beginning 2-7 msec after the initial pulse and ending 25-150 msec after the initial pulse. If the second pulse is received within the acceptable time window, the ethernet link is considered valid. If no pulse is received within this allowable window, the link is considered to be down. When a pulse is again received, the receiver waits for anywhere from 2-10 pulses within a 2-25 msec window to determine that the link is re-established. If a second pulse is received in a time window from 0-2 msec after the initial pulse, the initial pulse is rejected and the timing starts again from the second pulse.

Because of the existence of separate receive and transmit paths to each remote node in 10Base-T ethernet networks, operation in full duplex mode (i.e., simultaneous receive and transmit) is theoretically possible. An ethernet node capable of full duplex communications would preferably be downward compatible with currently available half-duplex 10Base-T systems so that it would be compatible therewith. A method for determining whether the transceiver to which it is connected also has full duplex communications capability is therefore needed. Currently, Intel Corporation of Santa Clara, Calif. markets a pseudo-full-duplex ethernet data-link controller. This controller, designated 82596, cannot transmit a new frame if the receiver is active, and is thus not a true full-duplex transceiver.

Accordingly, it is an object of the present invention to provide a full-duplex 10Base-T ethernet architecture, preferably in the form of a single integrated circuit, which allows any node in a 10Base-T network to determine whether the other ethernet transceiver with which it communicates has full-duplex communication capability and, if so, modify its behavior in conjunction with the data-link controller to establish independent transmit and receive communication channels.

BRIEF DESCRIPTION OF THE INVENTION

According to a first aspect of the present invention a 10Base-T ethernet transceiver capable of full-duplex communication is provided, preferably disposed in a single integrated circuit, which may also contain a communications controller and a Manchester code converter to minimize system chip count. The transceiver of the present invention includes circuitry for generating signals identifying it as a full-duplex capable transceiver and also includes circuitry for determining whether or not the transceiver to which it is connected is full-duplex capable. As presently preferred, each full-duplex-capable ethernet transceiver according to the present invention includes circuitry for generating a link-valid pulse train which also includes information identifying the sender as having full-duplex capability but which is downward compatible with half-duplex-capable transceivers.

Each full-duplex-capable ethernet transceiver according to the present invention also includes circuitry responsive to the link-valid pulse train which also includes circuitry for detecting the information in the link-valid pulse train which identifies a sender as having full-duplex capability. If the circuitry detects such information, it sends a signal to the communications controller to disable its transmit-defer-on-carrier sensed feature and thus allow full duplex operation.

An ethernet communications controller capable of full duplex communications in response to signals from the transceiver indicating such capability on the link, is also provided, preferably as a single integrated circuit, or integrated along with the transceiver of the present invention.

The present invention thus allows any node in a 10Base-T network to determine that its dual twisted pair data link has full-duplex communications capability and to modify its behavior to establish independent transmit and receive communication channels across the link. This technique effectively doubles the communication channel bandwidth to the node. Of course both the transceiver in the remote node and the transceiver in the central hub must both have full duplex capability to accomplish full duplex communications. If one of the transceivers does not have full duplex capability, the link is used as a prior art half-duplex link.

According to another aspect of the present invention, a 10Base-T ethernet architecture includes a plurality of ethernet transceivers each associated with a different remote node in the ethernet. Each node transceiver is connected by a transmit twisted pair and a receive twisted pair to a transceiver associated with a hub. A Link Test Signal protocol employed by full-duplex-capable transceivers in the network includes additional Link pulses to determine if their link has full duplex capability.

Like the prior art 10Base-T link-integrity protocol, the full-duplex 10Base-T ethernet link-integrity protocol of the present invention comprises a series of link-test pulses sent by each ethernet transceiver over its transmit twisted pair to the transceiver to which it is linked. However, unlike the prior art link-integrity protocol, each transceiver capable of full duplex operation sends a pair of link-integrity test pulses spaced apart by a first time period, presently preferred to be less than 2 msec, and preferably about 5.2 μsec. After the second pulse, a delay of between 2–150 msec, preferably about 13 msec, occurs, after which one or more pulses spaced apart by between 25–150 msec, preferably about 13 msec, are transmitted. The process is then repeated by again sending a pair of pulses separated by between less than 2 msec, and preferably about 5.2 μsec c, followed by N additional pulses spaced apart by between 2–150 msec, preferably about 13 msec. According to a presently preferred embodiment of the invention, the first and second pulses are separated by about 5.2 μsec and N=16.

If the receiving transceiver is a prior art transceiver and is not capable of full duplex operation, it will reject the first pulse of each pair of pulses and start its 2–150 msec validity timeout after the second of the pair of pulses, according to the aforementioned existing prior art protocol. Assuming that the link is up, the first of the next pair of pulses will then be received within the 2–150 msec window to establish a link valid condition.

If, however, the receiving transceiver is configured according to the present invention, and is thus capable of full duplex operation, it will recognize the pair of pulses separated by the 2–7 μsec delay as a full-duplex channel acknowledge signal indicating that the sender is a transceiver with full duplex capability. When two transceivers according to the present invention have ascertained the full-duplex channel capability of the other, one at the remote node side and the other at the switching hub side, signals are issued by the transceivers to their CSMA/CD ethernet communications controllers to indicate full-duplex or half-duplex channel resolution.

According to another aspect of the present invention, an ethernet communications controller associated with both the hub or the remote node includes circuitry which responds to the state of the full-duplex/half-duplex signal which identifies the sending transceiver as full-duplex capable to suppress the carrier-sense signal for transmission deferral in the controller. The controller will, however, continue to examine the number of bytes transmitted to identify jabber errors. All CSMA/CD defined behavior of the prior art ethernet protocol is followed for transmission with the exception of the carrier-sense based transmission defer. This circuitry allows the ethernet communications controller to transmit and receive at the same time on the independent transmit and receive channels and thus realize full duplex operation. There will be no simultaneous transmit/receive collisions in this scheme.

In a 10Base-T network with full-duplex nodes connected to a switching hub or multiport bridge according to the present invention, the effective network bandwidth is doubled. More significantly the packet delay is reduced to that of the central switch or bridge, a more predictable delay. This allows for dedicated ethernet full duplex channels for individual nodes i.e, 10M bits/sec transmit and 10M bits/sec receive channels, with no collisions. Such a network can then be used for time critical applications like transaction processing or manufacturing in place of a token-passing-based network.

BRIEF DESCRIPTION OF THE DRAWINGS

FIG. 6b is a timing diagram showing a typical pulse train produced by a state machine such as the one depicted in FIG. 6a.

FIG. 7b is a timing diagram showing a typical pulse train produced by a state machine such as the one depicted in FIG. 7a.

FIG. 8 is a schematic diagram of an illustrative digital circuit which may be used to implement the state machines disclosed in FIG. 7a.

FIGS. 9a and 9b are state-machine diagrams describing hardware for detecting full-duplex-capable pulses within the link-pulse stream according to a presently preferred embodiment of the invention.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
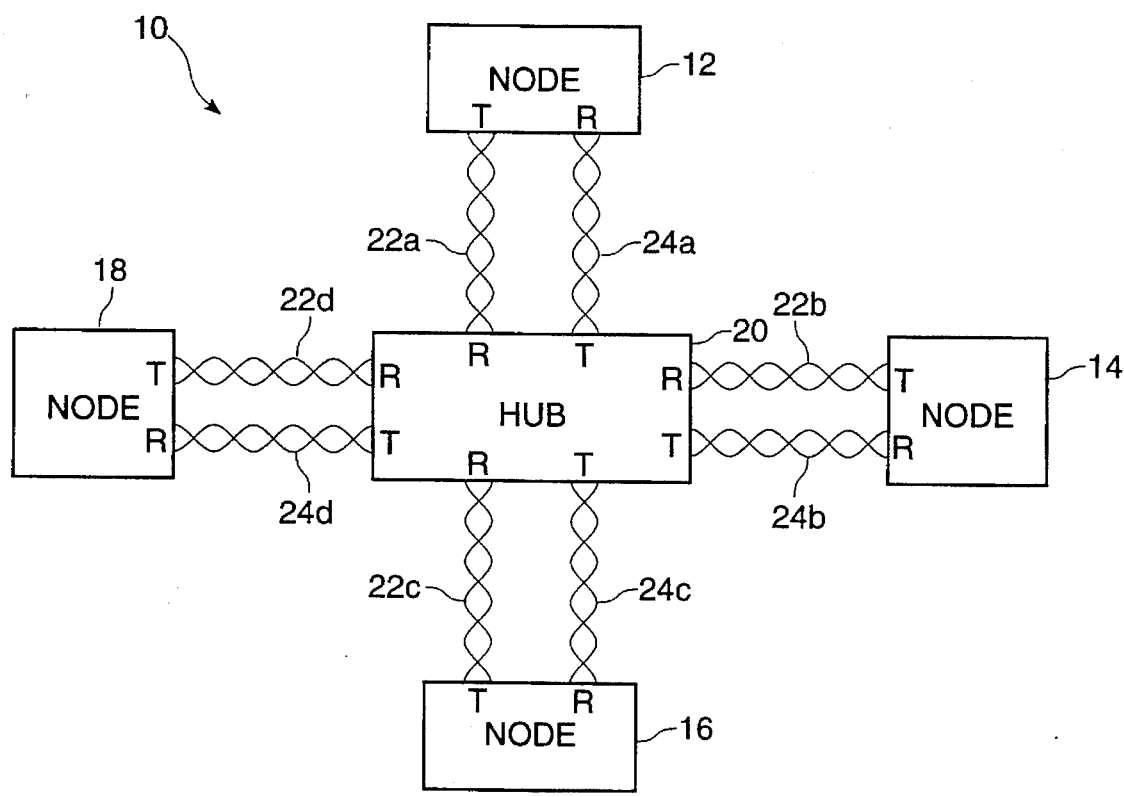
FIG. 1 is a block diagram of a typical 10Base-T ethernet network in which the present invention may be employed.

Referring first to FIG. 1, a block diagram is shown of an illustrative 10Base-T ethernet network 10, including a plurality of remote nodes 12, 14, 16, 18 connected to a central hub 20, in which the present invention may be employed. This configuration is known in the art and is well understood. Each remote node 12, 14, 16, and 18 may be connected to hub 20 by two twisted pair cables, shown as 22a–22d and 24a–24d. One of the twisted pairs 22a–22d is used for transmitting data from the remote node to the hub and the other twisted pair 24a–24d is used for transmitting data from the hub to the remote node. Together, these two twisted pair cables form the "link" between the hub and the remote node. Ethernet network 10 is shown having four remote nodes, but those of ordinary skill in the art will readily recognize that an arbitrary number of remote nodes may be connected to the hub 20, depending on its capacity.

Figure 2:
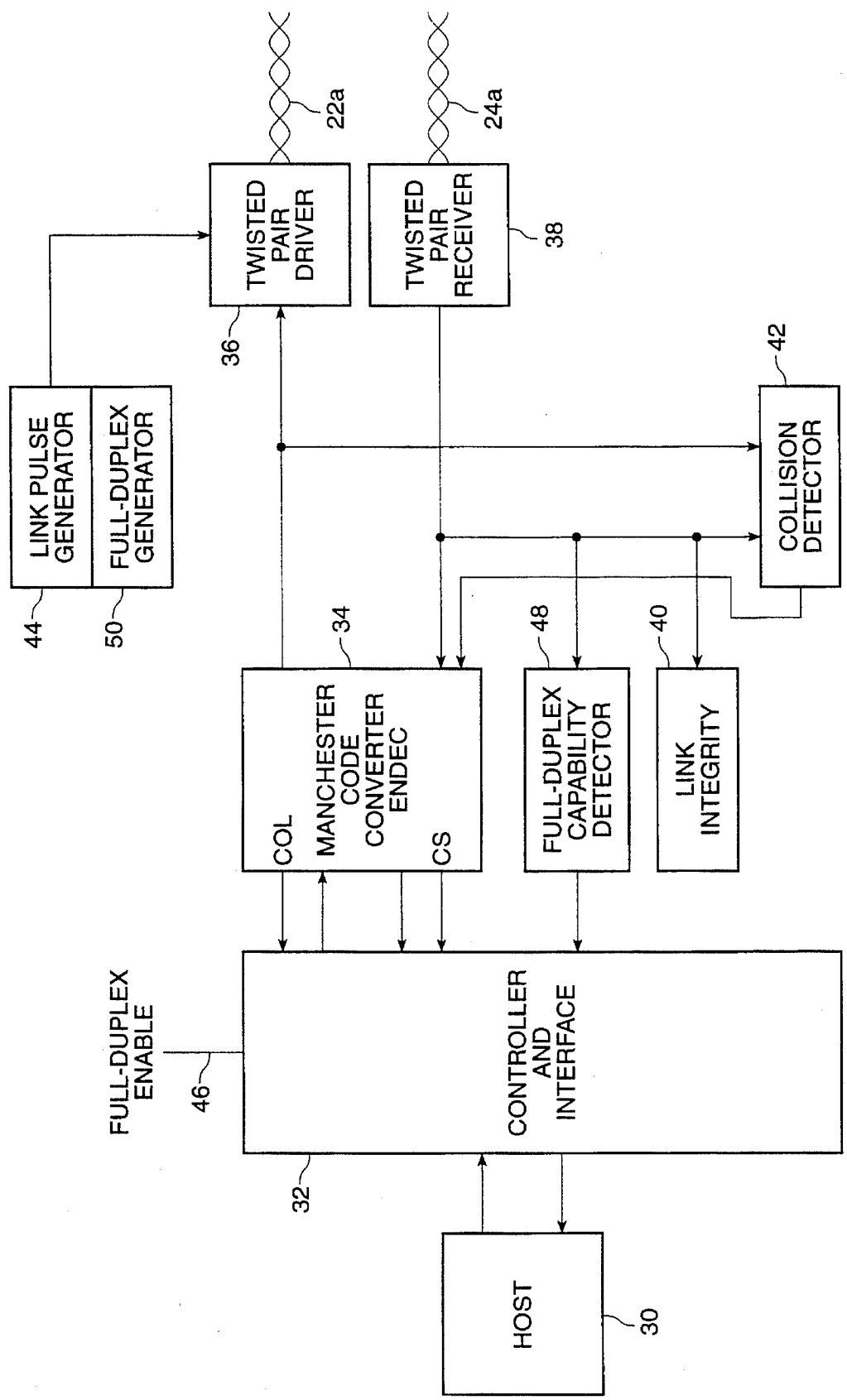
FIG. 2 is a block diagram of a portion of a typical 10Base-T ethernet node including a transceiver circuit and communications-controller circuit, showing the functional elements relating to the present invention.

Referring now to FIG. 2, a block diagram of a circuit for coupling a host device 30 to a 10Base-T twisted pair ethernet network is shown. The composition and operation of the circuitry of FIG. 2 is well defined and is well understood by those of ordinary skill in the art. Three, main components of the circuit may be conceptualized as a controller and interface unit 32 which connects to the host, a manchester code converter (MCC ENDEC) 34, used to convert the data to and from transmission format, and a transceiver, comprising a twisted-pair driver 36 and a twisted-pair receiver 38. A link integrity circuit 40 monitors link-pulse activity from the twisted pair receiver 38. Its function is to sense the presence of link pulses from the sender at the other end of twisted pair cable 24a and close down the transmitting function of the circuit if a link failure has occurred. Collision-sense and loop-back circuit 42 monitors the transmit and receive activity of twisted-pair driver 36 and a twisted-pair receiver 38 and generates a collision signal in response to sensing simultaneous transmit and receive activity. The collision signal is asserted through the ENDEC 34 to the controller and interface unit 32, which responds by backing off from attempting to transmit followed by retransmission attempts. In addition, collision-sense and loop-back circuit 42 provides the standard loop-back function of the 10-Base-T ethernet protocol.

Finally, link-pulse generator circuit 44 provides link pulses to twisted-pair driver 36 for transmission to the node with which the circuit of FIG. 2 is communicating. In accordance with the 10Base-T ethernet standard, these pulses are transmitted across twisted pair cable 22a during periods when the node is not transmitting data.

Those of ordinary skill in the art will recognize that numerous possibilities exist for both designing particular circuits as well as for integrating the above-described circuitry for performing ethernet functions. Different examples of currently-available integrated circuits for performing the functions of the circuitry of FIG. 2 include (by manufacturer's part No. and function) 83902 combination controller, manchester encoder/decoder and transceiver available from National Semiconductor Corporation; 79C960 combination controller, manchester encoder/decoder and transceiver available from Advanced Micro Devices of Sunnyvale, Calif.; 92C03 transceiver available from NCR Corporation of Fort Collins, CO; and 83C94 transceiver, 8020 and 8023 manchester encoder/decoder, and 8003 and 8005 controller available from SEEQ Technology, Inc. of Fremont, Calif.

As previously disclosed, the function of link integrity circuit 40 is to monitor the receive twisted pair cable 24a for link pulses indicating the integrity of the link connection between the circuitry 30 and its communicating partner. According to the ANSI/IEEE ethernet standard 802.3-1990, link pulses may be transmitted during times of no packet transmission activity. According to the ANSI/IEEE standard, the minimum time at which a second link-integrity pulse may appear is from between 2 and 7 msec after a first link-integrity pulse. The maximum time delay between a first link-integrity pulse and a second link-integrity pulse is between 50 and 150 msec if the transceiver is in a link-pass state (i.e., it has determined that a link exists), and between 25 and 150 msec if the transceiver is in a link-fail state (i.e., if no link pulses have been detected for a certain time). According to the standard, the link-pass state may be entered after sensing from between two and 10 link-integrity pulses.

Figure 3:
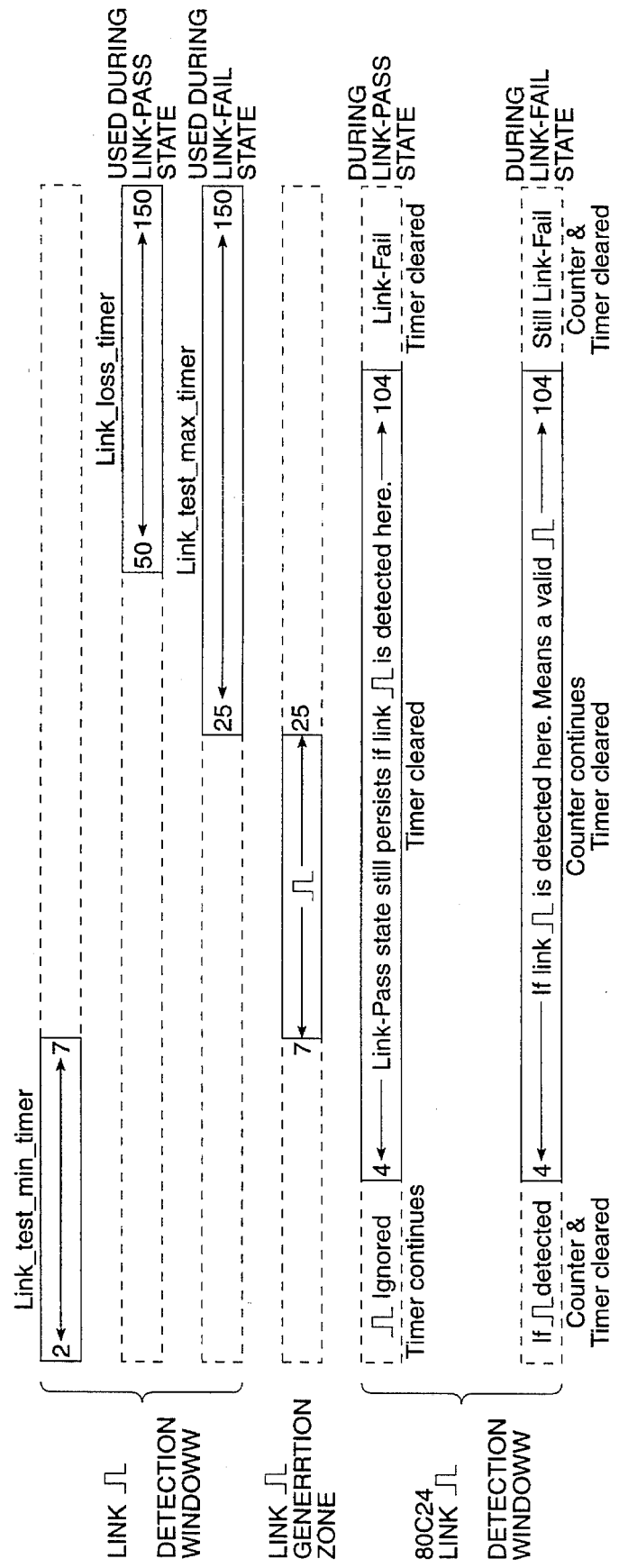
FIG. 3 is a diagram of a typical prior art link-integrity pulse train used in 10Base-T ethernet networks such as the one depicted in FIG. 1.

FIG. 3 is a timing diagram of train of illustrative link pulses and shows the permissible window within which sequential ones of the link pulse must be generated. Those of ordinary skill in the art will recognize that designs for circuits such as link-pulse generator circuit 44 of FIG. 2 to perform this function are straightforward. In similar fashion, designs for circuits such as link integrity circuit 40 are also straightforward, the object being that for each pulse detected, the next pulse should be detected more than 2 msec and less than 150 msec later.

According to the present invention, a method and apparatus is disclosed for adapting the circuitry of FIG. 2 and the link-pulse link integrity monitoring protocol to detect whether the ethernet node at the other end of the twisted pair cables 22a and 24a is capable of operating in full-duplex mode, and if so, configuring the circuit of FIG. 2 to operate in full duplex mode. The method and apparatus of the present invention are fully downwardly compatible with existing 10Base-T ethernet technology. If an ethernet transceiver and controller configured according to the present invention are connected by twisted pair cables to a transceiver and controller combination which are not capable of full-duplex operation, the network spoke they comprise will simply operate in half-duplex mode and the full-duplex-capable signals asserted by the full-duplex-mode-capable transceiver end of the node will simply be ignored by the half-duplex transceiver and controller.

According to the present invention, each transceiver capable of operating in full duplex communication mode sends a full-duplex-capable signal to the transceiver to which it is connected on the network. As presently preferred, the full-duplex-capable signal comprises an extra pulse periodically imbedded in the link-integrity pulse stream already used to verify the integrity of the network connection. This extra pulse is timed such that it will be ignored by the link-integrity circuit 40 of any transceiver following the IEEE specifications which does not have full-duplex capability according to the present invention.

Figure 4:
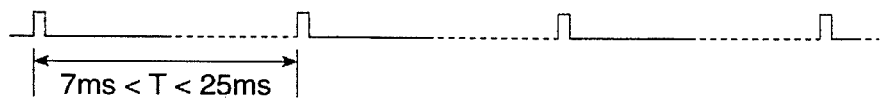
FIG. 4 is a diagram of a link-integrity pulse train according to a presently preferred embodiment of the invention for use in 10Base-T ethernet networks.
Figure 4:
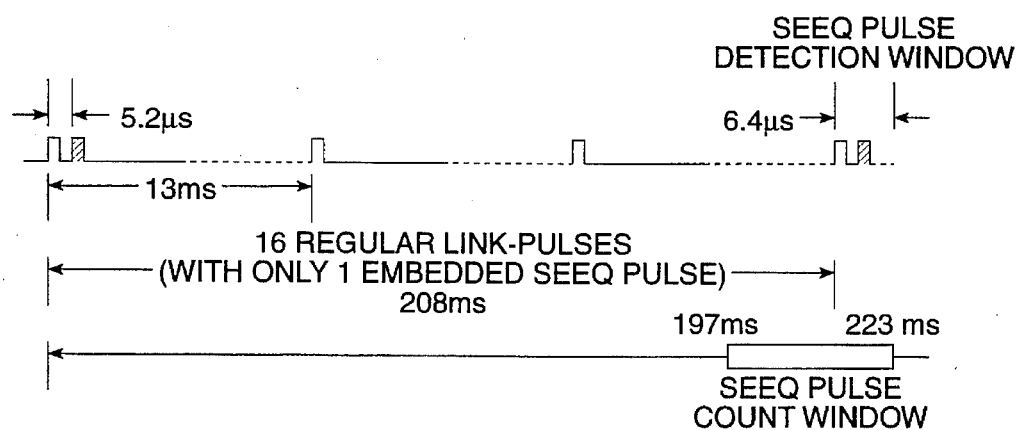

Referring now to FIG. 4, a timing diagram of a presently preferred embodiment of a link-integrity pulse train incorporating the full-duplex-capable signal of the present invention is presented. According to a presently preferred embodiment of the invention, the link-integrity pulse repetition rate is 13 msec, which falls in the approximate center of the 7–25 msec link-integrity pulse generation zone bounded by the conditions set forth in the standard. Briefly, the full-duplex-capable signal comprises an extra pulse imbedded in the link-integrity pulse stream at a position from less than 2 msec, preferably about 5.2 μsec following every Nth link-integrity pulse. As presently preferred, one extra pulse is inserted in the link-pulse stream 5.2 μsec and N=16 (i.e., an extra pulse is inserted after every sixteenth link-integrity pulse. FIG. 4 shows the additional full-duplex-capable pulses inserted in the link-integrity pulse train. Those of ordinary skill in the art will recognize that FIG. 4 is diagrammatic and that the actual pulse shape of the link pulses used in the ethernet architectures of this type is specified by ANSI/IEEE standards. Circuits for actually generating pulses having the required shape are well known in the art.

Figure 5:
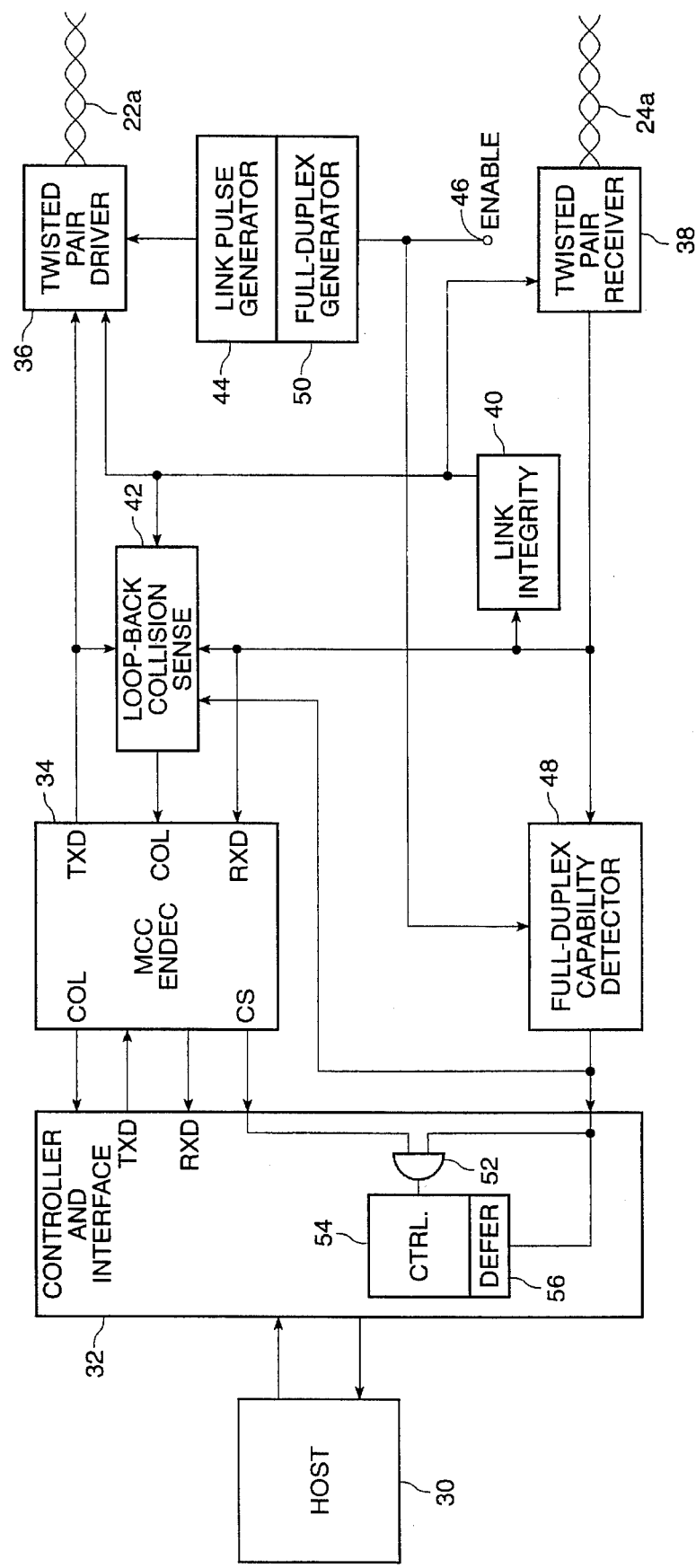
FIG. 5 is a block diagram of a portion of a 10Base-T ethernet transceiver circuit and communications-controller circuit according to a presently preferred embodiment of the invention, showing the functional elements relating to the present invention.

Referring now to FIG. 5, a block diagram of a circuitry for coupling a host device 30 to a 10Base-T twisted pair ethernet network is shown. The circuitry of FIG. 5 is much like that of FIG. 2, and is thus seen to include controller and interface unit 32 which connects to the host 30, MCC ENDEC 34, used to convert the data to and from transmission format, and a transceiver, comprising a twisted-pair driver 36 and a twisted-pair receiver 38. Unlike the circuit of FIG. 2, the circuit of FIG. 5 may include a full-duplex-enable input 46, which may terminate at an I/O pin of the integrated circuit. When the logic level on full-duplex-enable input 46 is true, the full-duplex capability of the present invention is enabled, and when it is false, the full-duplex capability of the present invention is disabled. Those of ordinary skill in the art will recognize that such a function is optional but may be convenient to users.

A link integrity circuit 40 monitors link-pulse activity from the twisted pair receiver 38. Like its counterpart in FIG. 2, its function is to sense the presence of link pulses from the sender at the other end of twisted pair cable 24a and close down the transmitting function of the circuit if a link failure has occurred. However, unlike the link integrity circuit 40 of FIG. 10, link integrity circuit 40 of FIG. 5 is associated with a full-duplex-capability detector circuit 48, with which it interacts. The function of full-duplex-capability detector circuit 48 is to detect the presence of the embedded extra pulses which comprise the full-duplex-capable signal of the present invention. According to the presently preferred embodiment of the invention, if two consecutive extra pulses as shown in FIG. 4 are detected (i.e., one following a first link-integrity pulse and one following a seventeenth link-integrity pulse), full-duplex-capability detector circuit 48 presents a full-duplex-enable signal to controller 32 indicating that the transceiver at the other end of the link is full-duplex capable. Full-duplex enable input 46 is connected to full-duplex-capability detector circuit 48, which is rendered operational only when the enable signal is true. Full-duplex-capability detector circuit 48 provides a signal which is used by controller 32 and by collision sense and loop-back circuit 42.

As in the embodiment of FIG. 2, collision-sense and loop-back circuit 42 monitors the transmit and receive activity of twisted-pair driver 36 and a twisted-pair receiver 38 and generates a collision signal in response to sensing simultaneous transmit and receive activity. The collision signal is asserted to the MCC ENDEC, which, in turn, asserts the collision signal to the controller and interface unit 32. Controller 32 responds by backing off from attempting to transmit followed by retransmission attempts. In addition, a carrier-sense signal is asserted to controller and interface unit 32 in response to sensing transmit activity from the node. Controller 32 responds by backing off from attempting to transmission unless a full-duplex-enable signal has been presented to controller 32 and the full-duplex function has been enabled by a true input at full-duplex-enable input 46 of controller 32. In addition, indication of full-duplex capability from full-duplex-capability detector circuit 48 modifies the loop-back function in the transceiver by substituting the received signal for the looped back transmit signal.

Finally, link-pulse generator circuit 44 provides link pulses to twisted-pair driver 36 for transmission to the node with which the circuit of FIG. 2 is communicating. Link-pulse generator circuit 44 includes a full-duplex-capable signal generator circuit 50, whose function it is to embed extra full-duplex-capable pulses into the link-pulse train generated by link-pulse generator circuit 44. Full-duplex enable input 46 is connected to full-duplex-capable signal generator circuit 50, which is rendered operational only when the enable signal is true.

Controller 32 of FIG. 5 is modified by ANDing the carrier-sense (CS) signal from MCC ENDEC 34 with the full-duplex-capable signal from full-duplex-capability detector circuit 48 in AND gate 52 before that signal is passed to transmit-control circuitry 54. Transmit-control circuitry 54 may be the conventional circuitry employed in ethernet controllers. AND gate 52 only passes the CS signal from MCC ENDEC 34 to control circuitry 54 when the output of full-duplex-capability detector circuit 48 indicates no full duplex capability at the node at the other end of the lines 22a and 24a. As those of ordinary skill in the art will appreciate, when full-duplex-capability detector circuit 48 indicates that the node at the other end of lines 22a and 24a is full duplex capable, the blockage of the CS signal disables transmit defer on carrier sense. In addition, the defer circuitry 56 in control circuitry 54 is driven by the full-duplex-capability detector circuit 48 to cause transmit defer only long enough to assure that line reflections have ceased. In a typical ethernet environment, this defer period may be about 9.6 μsec. Because transmit defer on carrier sense is disabled, the controller 32 will allow transmission to take place when ready, regardless of whether receive is active. After transmission, retransmission will be enabled after a defer period only long enough to allow cessation of line reflections. As a result, the controller 32 will not see loop-back. The SQET function is also disabled.

Figure 6A:
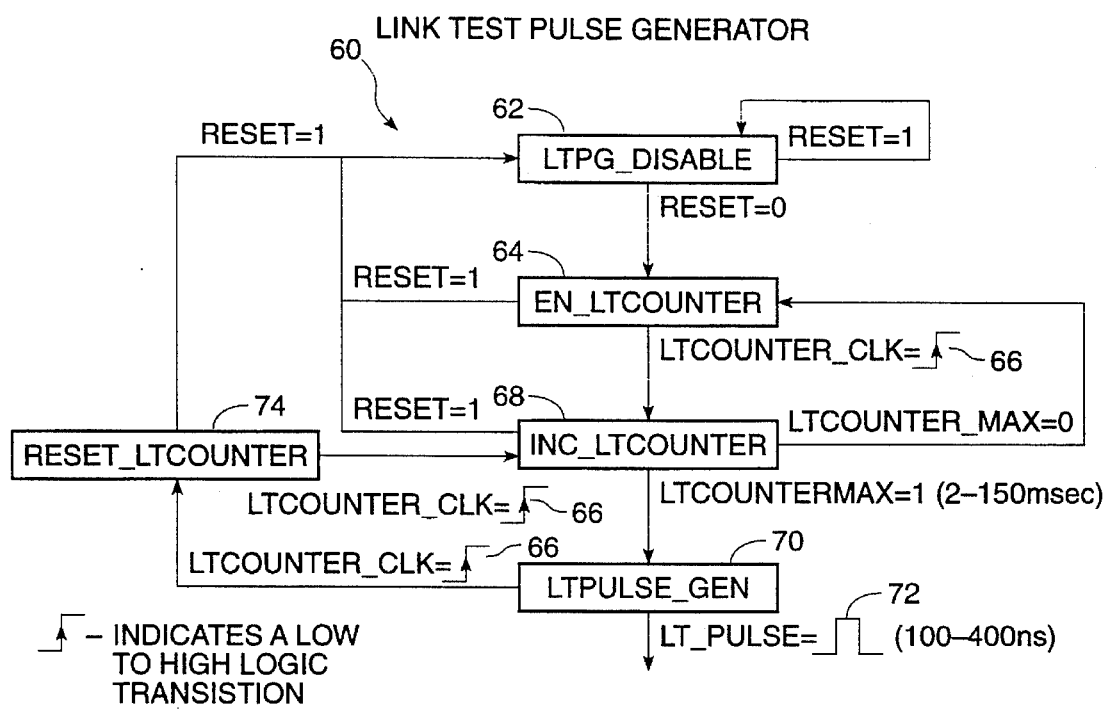
FIG. 6a is a state-machine diagram describing hardware for generation of conventional link-integrity pulses according to a presently preferred embodiment of the invention.

FIG. 6a is a state diagram for defining the pulse generation hardware comprising link-pulse generator circuit 44 and full-duplex-capable signal generator circuit 50. As those of ordinary skill in the art well know, the design of a link pulse generator circuit whose sole function is to generate a train of 100 nsec pulses spaced apart by, for example, 13 msec, is a task so trivial that it deserves little mention other than the well-known fact that a master clock can easily be divided down to produce such a pulse train.

Referring now to FIG. 6a, it may be seen that the state machine 60 includes a first link-test-pulse disable (LTPG_DISABLE) state 62 during which a RESET signal (RESET= 1) is applied to the state machine. The state machine 60 remains in this state as long as a RESET signal is asserted.

When the RESET signal is withdrawn (RESET=0), the state machine enters an enable-link-test counter (EN_LTCOUNTER) state 64, which enables a counter to count clock pulses until a count representing a desired interval (2–150 msec, preferably 13 msec) has been reached. At the occurrence of a clock pulse (shown at reference numeral 66, the state machine 60 advances to an increment link test counter (INC_LTCOUNTER) state 68 in which the link test counter is incremented and tested to determine if the maximum count LTCOUNTER_MAX is true, indicating that the interval has passed. If not, the state machine proceeds back to state 64. If so, the state machine proceeds to a generate-link-pulse (LTPULSE_GEN) state 70, in which a 100–400 μsec pulse (reference numeral 72) is generated.

Figure 6B:
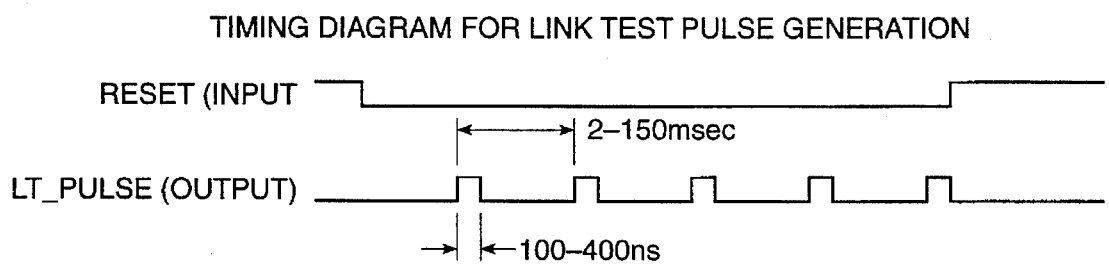

The state machine then proceeds to a reset-link-test-counter (RESET_LTCOUNTER) state 74, in which the counter is reset and the state machine proceeds to state 62. FIG. 6b shows a typical pulse train of link pulses which are generated by operation of this state machine 60 and illustrates the effect of the reset state which disables the state machine 60.

Figure 7A:
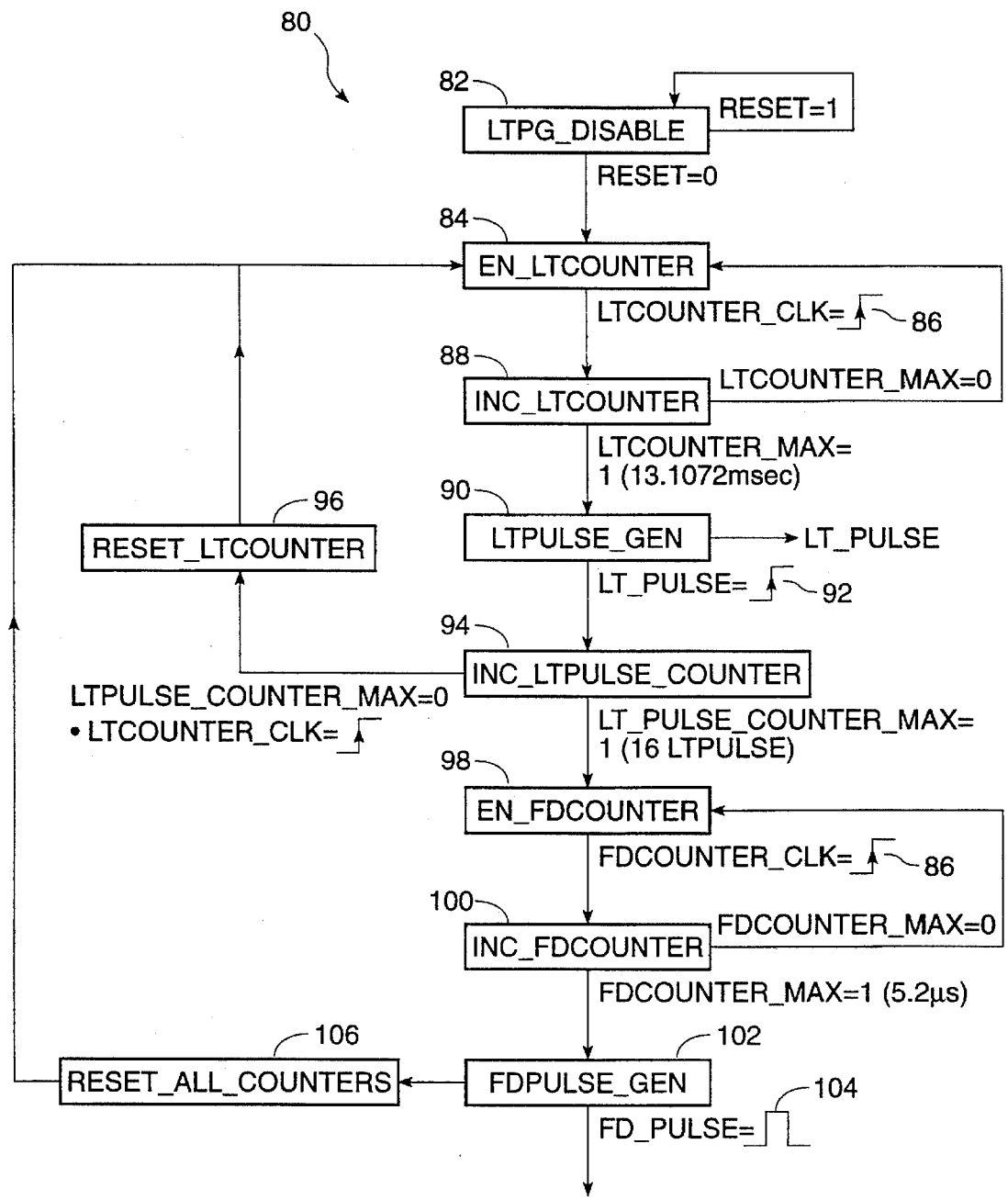
FIG. 7a is a state-machine diagram describing hardware for generation of full-duplex-capable pulses according to a presently preferred embodiment of the invention.

The additional pulses embedded in the link-pulse train to comprise the full-duplex capable-signal depicted in FIG. 4 may be synthesized according to the state machine depicted in FIG. 7a. Referring now to FIG. 7a, a state machine 80 includes a first link-test-pulse disable (LTPG_DISABLE) state 82 during which a RESET signal (RESET=1) is applied to the state machine. The state machine 80 remains in this state as long as a RESET signal is asserted.

When the RESET signal is withdrawn (RESET=0), the state machine enters an enable-link-test counter (EN_LTCOUNTER) state 84, which enables a counter to count clock pulses until a count representing a desired interval (2–150 msec) has been reached. At the occurrence of a clock pulse (shown at reference numeral 86, the state machine 60 advances to an increment link test counter (INC_LTCOUNTER) state 88 in which the link test counter is incremented and tested to determine if the maximum count LTCOUNTER_MAX is true. If not, the state machine proceeds back to state 84. If so, the state machine proceeds to a generate-link-pulse (LTPULSE_GEN) state 90, in which a 100–400 μsec pulse (reference numeral 92) is generated.

Up until this point, the operation of state machine 80 is identical to the operation of state machine 60 of FIG. 6a, with the exception that the RESET-LTCOUNTER state 72 is not entered. Instead, state machine 80 proceeds to increment-link-test-pulse-counter (INC_LTPULSE_COUNTER) state 94. The state of the link-test-pulse counter is tested. If the link-test-pulse count is not maximum (LT_PULSE_COUNTER=0), then the reset linktest counter (RESET_LTCOUNTER) state 96 is entered. In this state, the counter is reset when the LT_COUNTER clock pulse is sensed, and the state machine returns to state 84.

Figure 7B:
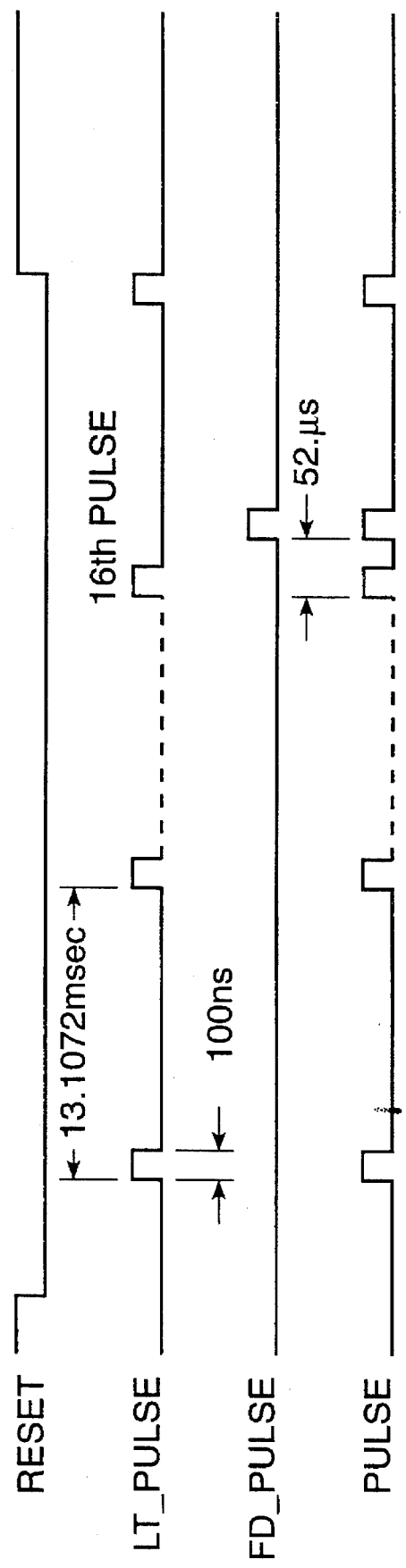

If, however, the link-test-pulse count is maximum (LT_PULSE_COUNTER=1, at a presently-preferred count of 16), then the state machine 80 proceeds to enable-full-duplex-counter (EN_FDCOUNTER) state 98. In this state, the state machine waits for a clock pulse 86 and then enters increment-full-duplex-counter (INC_FDCOUNTER) state 100, in which the full-duplex counter is incremented and tested to determine if the maximum count LTCOUNTER_MAX is true, indicating that the proper interval has passed and that a full-duplex pulse needs to be generated. If not, the state machine proceeds back to state 98 and waits for the next clock pulse 86. If so, the state machine proceeds to a generate-full-duplex-pulse (FDPULSE_GEN) state 102, in which a 100–400 μLsec full-duplex-capable pulse (reference numeral 104) is generated. The state machine then proceeds to a reset-all-counters (RESET_ALL_COUNTERS) state 106, in which all counters are reset. The state machine 80 then proceeds to state 84. FIG. 7b shows a typical pulse train of link pulses which are generated by operation of this state machine 80 and illustrates the effect of the reset state which disables the state machine 80.

Figure 8:
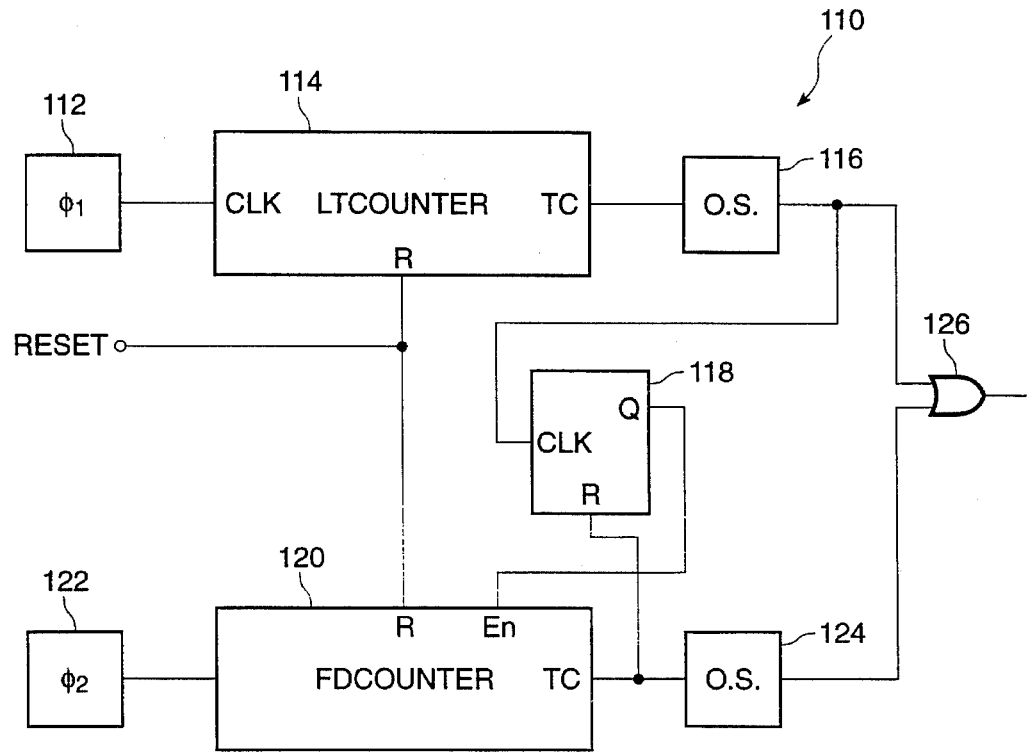

Referring now to FIG. 8, a schematic diagram of an illustrative digital circuit which may be used to implement the state machines disclosed in FIG. 7a. Those of ordinary skill in the art will recognize that actual circuit embodying the state machines of FIG. 7a will likely be generated by languages such as HDL and VHDL, and therefore that the circuit of FIG. 8 is merely illustrative.

Full-duplex-capable pulse generator circuit 110 includes an appropriate clock source 112, which drives LTCOUNTER counter 114. The terminal-count output of counter 114 drives one-shot (monostable) multivibrator 116. The output of multivibrator 116 is the link-test (LT_PULSE) pulse train. Clock source 112 may be an oscillator, or may be derived from an oscillator by a divider circuit as is known in the art. The output of multivibrator 116 is also presented to the input of flip-flop 118. The output of flip-flop 118 is presented to a count-enable input of counter FDCOUNTER 120. Counter 120 is clocked by an appropriate clock source 122. The terminal count output of counter 120 drives monostable multivibrator 124, which produces the full-duplex-capable (FD_PULSE) pulses. The outputs of multivibrators 116 and 124 are ORed in OR gate 126, which produces the composite signal. The reset inputs of counters 114 and 120 are connected together to a RESET signal.

Figure 9A:
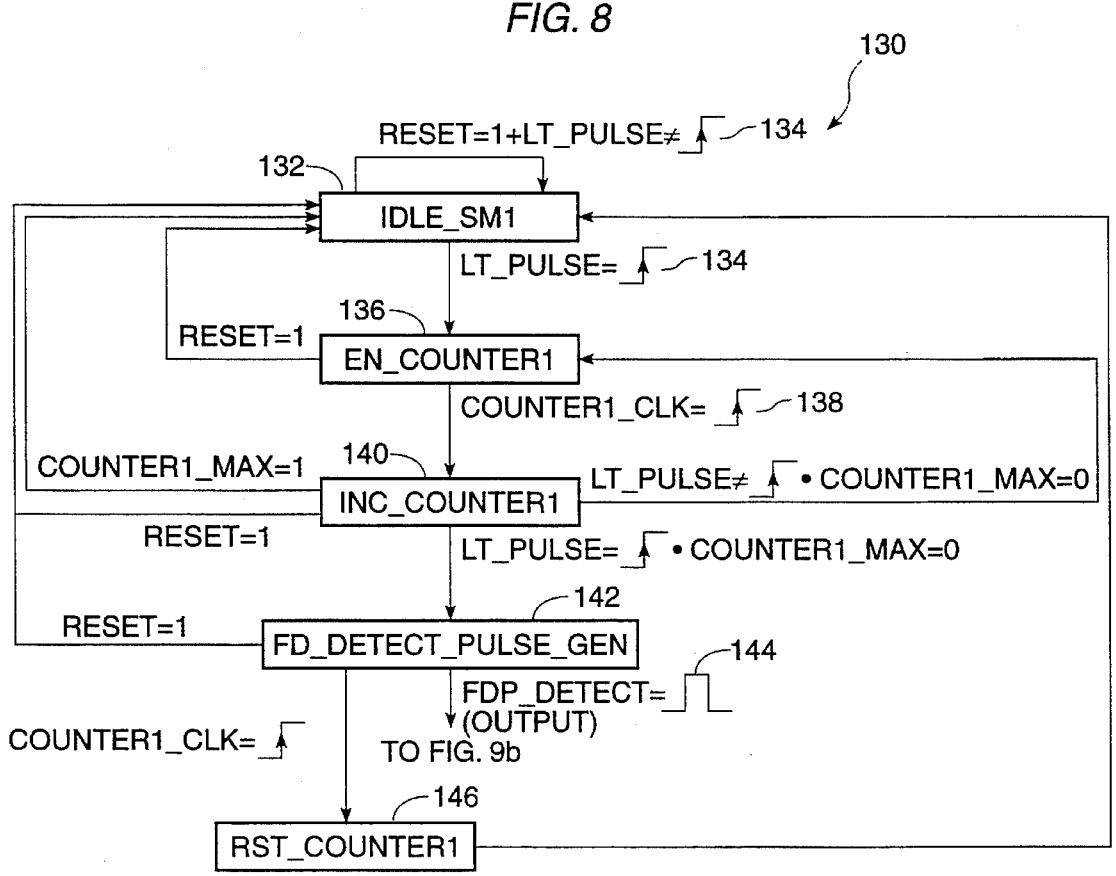

Referring now to FIGS. 9a and 9b, a state-machine diagram describes hardware for generating a full-duplex-capable signal in response to detected full-duplex-capable pulses within the link-pulse stream according to a presently preferred embodiment of the invention. State machine 130 includes a first idle (IDLE_SM1) state 132, which is occupied in the presence of either a RESET signal (RESET=1) or absence of a sensed link-test pulse positive transition (reference numeral 134). When RESET=0 and a link-test pulse (LT_PULSE) positive transition is sensed, state machine 130 proceeds to enable-first-counter (EN_COUNTER1) state 136. In state 136, a first counter waits for pulses from clock COUNTER1_CLK (reference numeral 138). Upon sensing a pulse, state machine 130 changes to increment-counter1 (INC_COUNTER1) state 140. A time interval set by COUNTER1_MAX=1 is being measured. If, during this interval (i.e., COUNTER1_MAX=0), an additional link pulse 134 is not sensed, the state machine returns to state 136. If no additional link pulse has been sensed by the time COUNTER1_MAX=1, the state machine 130 returns to idle state 132 until a new link pulse 134 is sensed. COUNTER1_MAX is preferably about 6.4 μsec.

If, however, an additional pulse is sensed prior to COUNTER1_MAX=1, state machine 130 changes to full-duplex-detect-pulse-generate (FD_DETECT_PULSE_GEN) state 142 in which a full-duplex-detect (FDP_DETECT)pulse 144 is generated. After generation of pulse 144, the state machine enters reset-counter1 (RST_COUNTER1) state 146, in which the first counter is reset, After resetting the first counter, the state machine 130 returns to state 132.

Referring now to FIG. 9b, the operation of state machine 150 will be described. State machine 150 operates when a full-duplex-detect pulse 144 is generated. In a first idle (IDLESM2) state 152, state machine 150 idles either while RESET=1 or no full-duplex-detect pulse 144 is sensed. When a full-duplex-detect pulse 144 is sensed, state machine 150 enters an enable-second-counter (EN_COUNTER2) state 154. In state 154, a second counter is incremented from clock COUNTER2_CLK (reference numeral 156). Upon sensing a clock pulse, state machine 150 changes to increment-second-counter (INC_COUNTER2) state 158. A delay time interval set by COUNTER2_MAX represents the minimum time of a timing window in which a second full-duplex pulse is expected. COUNTER2_MAX is preferably about 197–203 msec.

After COUNTER2_MAX=1 is true, state machine 150 changes to enable-third-counter (EN_COUNTER3) state 160. If, during this state, a new full-duplex-detect pulse 162 is detected, the state machine changes to the SET_FD_MODE state 164 and sets a signal FDSET 166 to 1 to indicate that full-duplex capability has been detected. If not, the state machine 150 waits for a COUNTER_3CLK pulse (reference numeral 168). After each COUNTER3_CLK clock pulse is sensed, the state machine changes to the increment-counter3 (INC_COUNTER3) state 170. If an additional full-duplex detect pulse 162 is not sensed, the state machine returns to state 160. If no full-duplex-detect pulse has been sensed by the time COUNTER3_MAX=1, the state machine 150 returns to idle state 152 until an additional full-duplex detect pulse 144 is sensed. COUNTER3_MAX is preferably about 216–223 msec.

If an additional full-duplex detect pulse 162 is sensed while the state of the third counter is COUNTER3_MAX=0, the state machine changes to set-full-duplex mode (SET_FD_MODE) state 164. In this mode, a full-duplex capability is asserted by signal FD_SET=1 (at reference numeral 166), and state machine 150 enters enable-fourth-counter (EN_COUNTER4) state 172, in which FD_SET=1 remains true. A COUNTER4_CLK clock pulse (reference numeral 174) causes state machine 150 to enter (INC_COUNTER4) state 176. In this state, the fourth counter is incremented and FD_SET=1 remains true. If COUNTER4_MAX=0, or if another full-duplex-detect pulse 144 occurs, or if a carrier is sensed (CARRIER=1), state machine 150 changes to reset fourth counter (RST_COUNTER4) state 178 in which the fourth counter is reset, and then returns to state 172. If COUNTER4_MAX=1, state machine 150 returns to state 152. FD_SET=1 sets all counters except for the fourth counter and is in its true condition only in states 170 and 176.

The purpose of states 172 and 176 is to determine if the full-duplex-capable state should be terminated, i.e., by a loss of full-duplex detect pulses within the time COUNTER4_MAX=1. COUNTER4_MAX is preferably about 833–840 msec.

Figure 10:
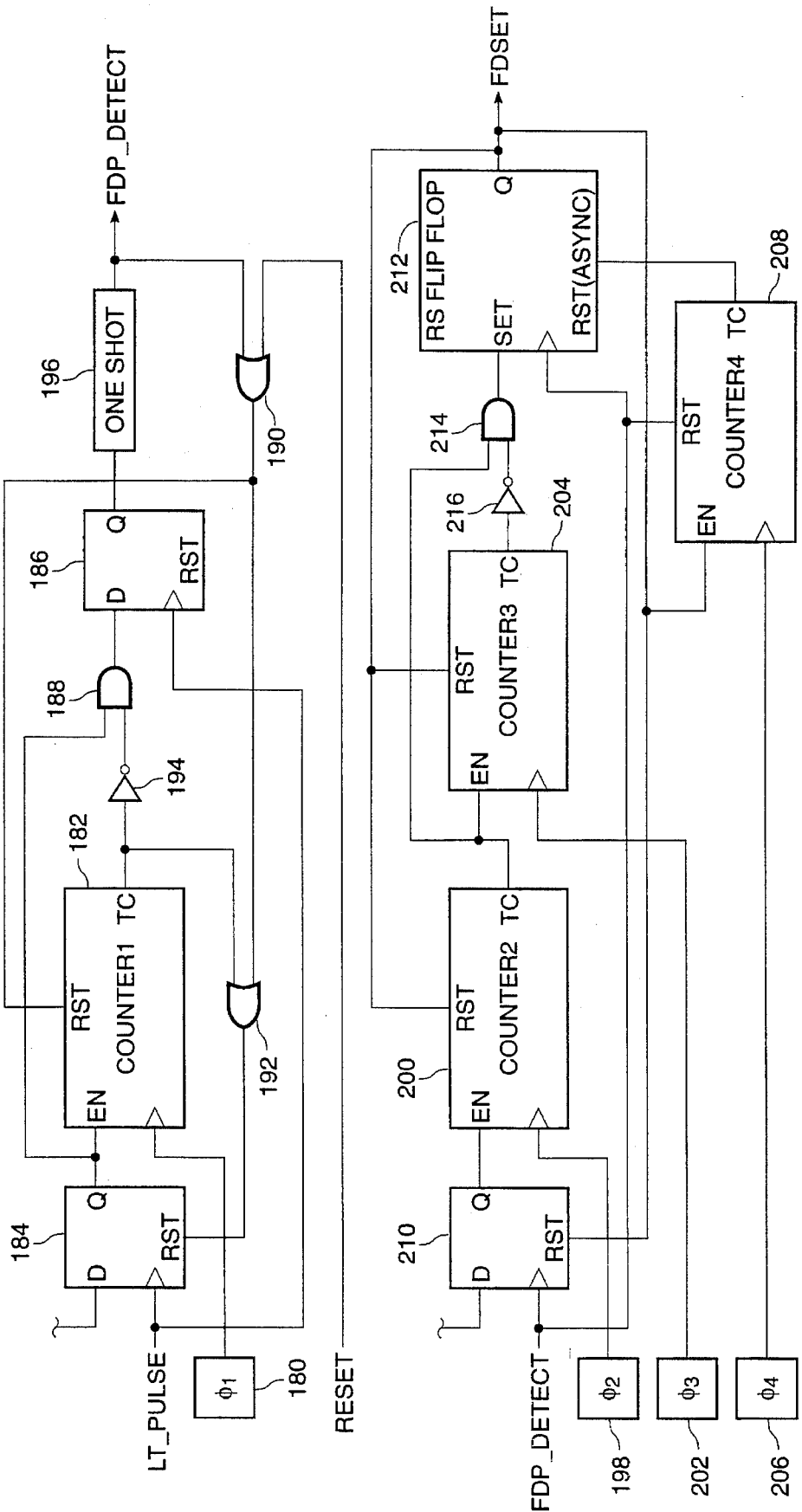
FIG. 10 is a schematic diagram describing an illustrative digital circuit which may be used to implement the state machines of FIGS. 9a and 9b.

Referring now to FIG. 10, a schematic diagram of an illustrative digital circuit which may be used to implement the state machines disclosed in FIGS. 9a and 9b. Those of ordinary skill in the art will recognize that actual circuit embodying the state machines of FIGS. 9a and 9b will likely be generated by languages such as HDL and VHDL, and therefore that the circuit of FIG. 10 is merely illustrative.

Clock 180 supplies COUNTER_1 clock pulses to COUNTER1 182. Flip-flops 184 and 186, and gates 188, 190, 194, and inverter 192, provide for the conditional transitions of the state machine of FIG. 9a, and one-shot multivibrator 196 generates the FDP_DETECT pulse 144.

Clock 198 supplies COUNTER_2 clock pulses to COUNTER1 200. Clock 202 supplies COUNTER_3 clock pulses to COUNTER3 204. Clock 206 supplies COUNTER_4 clock pulses to COUNTER4 208. D-flip-flop 210, RS flip-flop 212, AND gate 214 and inverter 216, provide for the conditional transitions of the state machine of FIG. 9b. RS flip-flop 210 supplies the FD_SET signal.

Those of ordinary skill in the art will recognize that the state diagrams of FIGS. 6a, 7a, 9a, and 9b are typically used to generate a gate level circuit by employing widely-used hardware-description languages such as HDL or VHDL, available from Viewlogic of Santa Clara, Calif. The state diagrams of FIGS. 6a, 7a, 9a, and 9b thus fully describe the preferred embodiment of the invention. FIGS. 8 and 10 merely illustrate one of a number of possible gate-level implementations thereof.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method of implementing communication between a first node coupled to an ethernet transceiver and a second node coupled to said ethernet transceiver, said method comprising transmitting, from said first node, a link-integrity signal having a capability-indicator portion indicating a communication capability available at said first node, said capability-indicator portion being downward compatible with a half-duplex 10Base-T capability of said ethernet transceiver;

receiving said link-integrity signal at said second node;

detecting said capability-indicator portion of said link-integrity signal at said second node; and transmitting, from said second node, a capability signal responsive to said capability-indicator portion of said link-integrity signal.

2. A method as in claim 1, wherein said capability-indicator portion comprises an indicator of a protocol capability of said first node.

3. A method as in claim 2, wherein said protocol capability comprises capability for a full-duplex communication protocol.

4. A method as in claim 2, comprising comparing, at said second node, a capability indicated by said capability-indicator portion with a capability available at said second node; and communicating between said first node and said second node using a set of capabilities available at both said first node and said second node.

5. A method of establishing communication on a network, said method comprising transmitting a link-integrity signal, said link-integrity signal being downward compatible with a half-duplex 10Base-T capability of an ethernet transceiver, from a first node on said network, said link-integrity signal comprising an indicator of a type of communication capability;

receiving said link-integrity signal at a second node on said network;

transmitting a capability signal from said second node, responsive to said indicator.

6. A method as in claim 5, wherein said indicator and said capability signal each comprises an indicator of a protocol capability.

7. A method as in claim 6, wherein said protocol capability comprises capability for a full-duplex communication protocol.

8. A method as in claim 6, comprising comparing, at said second node, a capability indicated by said capability-indicator portion with a capability available at said second node; and communicating between said first node and said second node using a set of capabilities available at both said first node and said second node.

9. A method as in claim 5, wherein said indicator comprises an indicator of a plurality of protocol capabilities.

10. A method as in claim 9, wherein said plurality protocol capabilities comprise an indicator of a full-duplex capability and an indicator of a 10Base-T capability.

11. A method as in claim 9, comprising comparing, at said second node, a capability indicated by said capability-indicator portion with a capability available at said second node; and communicating between said first node and said second node using a set of capabilities available at both said first node and said second node.

12. A method of establishing communication on a network, said method comprising transmitting a link-integrity signal from a first node on said network, said link-integrity signal comprising a first plurality of pulses and a second plurality of pulses interspersed with said first plurality of pulses, said second plurality of pulses comprising a set of data bits;

receiving said link-integrity signal at a second node on said network, said second node being coupled to an ethernet transceiver, said first plurality of pulses comprising a link-integrity signal recognizable by said ethernet transceiver;

detecting said second plurality of pulses at said second node; and transmitting, from said second node, a link-integrity signal responsive to said second plurality of pulses of said first link-integrity signal.

13. A method as a claim 12, wherein said second plurality of pulses of said first link-integrity signal comprises at least one bit representative of a protocol capability of said first node.

14. A method as in claim 13, wherein said protocol capability comprises capability for a full-duplex communication protocol.

15. A method as in claim 13, comprising comparing, at said second node, a capability indicated by said at least one bit with a capability available at said second node; and communicating between said first node and said second node using a set of capabilities available at both said first node and said second node.

16. A communication network, comprising a communication medium;

a first and a second node;

an ethernet transceiver coupled to said second node; and a link-integrity signal comprising a first plurality of pulses, whereby said first plurality of pulses comprise a link-integrity signal recognizable by said ethernet transceiver;

a second plurality of pulses interspersed with said first plurality of pulses, said second plurality of pulses comprising a set of data bits representative of a communication capability of said first node.

17. A network as in claim 16, wherein said first plurality of pulses comprise a sequence of pulses having a substantially uniform temporal spacing and defining a sequence of interpulse gaps.

18. A network as in claim 16, wherein said second plurality of pulses are disposed in at least some of said interpulse gaps.

* * * * *

UNITED STATES PATENT AND TRADEMARK OFFICE
CERTIFICATE OF CORRECTION

PATENT NO. : 5,504,738
DATED : April 2, 1996
INVENTOR(S) : Namakkal S. Sambamurthy, Woo-Ping Lai, John P. VanGilder It is certified that error appears in the above-indentified patent and that said Letters Patent is hereby corrected as shown below:

Column 9, line 35, after "86" insert --)--.

Column 11, line 49, replace "170" with --172--.

Column 11, line 64, replace "194" with --192--.

Column 11, line 64, replace "192" with --194--.

Signed and Sealed this

Fifth Day of November, 1996

Attest:

BRUCE LEHMAN

Attesting Officer      Commissioner of Patents and Trademarks